United States Patent [19]

Hancock et al.

[11] Patent Number: 4,676,275

[45] Date of Patent: Jun. 30, 1987

[54] 360 DEGREE PIPE REPAIR CLAMP

[75] Inventors: Garry W. Hancock, Texarkana, Tex.; Scott W. Love, Charlotte, N.C.

[73] Assignee: Rockwell International Corporation, Pittsburgh, Pa.

[21] Appl. No.: 879,735

[22] Filed: Jun. 27, 1986

[51] Int. Cl.⁴ .............................................. F16L 55/16
[52] U.S. Cl. ....................................... 138/99; 138/156
[58] Field of Search ................. 138/99, 103, 110, 128, 138/156, 157, 161; 29/456, 457; 285/15, 252, 253, 373; 24/277, 278; 166/241; 175/325

[56] References Cited

U.S. PATENT DOCUMENTS

| | | | |
|---|---|---|---|
| 2,009,744 | 7/1935 | Pfefferle | 138/99 X |
| 2,417,741 | 3/1947 | Dillon | 138/99 X |
| 2,690,193 | 9/1954 | Smith | 138/99 |
| 4,083,087 | 4/1978 | Hale | 138/99 X |

Primary Examiner—James E. Bryant, III

[57] ABSTRACT

A repair clamp for pipelines and in particular for clamps which are adapted for use on relatively small pipe sizes and which provide a full 360° seal around the entire periphery of the pipes on which the clamps are used.

9 Claims, 2 Drawing Figures

360 DEGREE PIPE REPAIR CLAMP

FIELD OF THE INVENTION

This invention relates to repair clamps for pipelines and in particular for clamps which are adapted for use on relatively small pipe sizes and which provide a full 360° seal around the entire periphery of the pipes on which the clamps are used.

DESCRIPTION OF THE PRIOR ART

Typical of prior art clamps which provide a full circumferential seal are those shown in the U.S. Pat. Nos. 2,936,186 to Dunmire and U.S. Pat. No. 3,088,185 to Smith. These prior art clamps however are unnecessarily complicated in design, expensive to manufacture and difficult to install in the field. Moreover, the clamp shown in U.S. Pat. No. 3,088,185 is not well suited for use with relatively small sizes of pipes, for example $1\frac{1}{2}''$ or smaller, and is not particularly suited for use on pipelines made of non-metallic material such as plastic.

The clamp shown in U.S. Pat. No. 3,088,185 is comprised of a metallic band 12 to which a gasket 17 has been secured for a major portion of its circumference. The ends of the gasket are tapered where they meet and overlap in the assembly. An armor strip 20 is secured to the right end 29 (as shown in FIG. 2) of the band 12 but is not secured to the left end 29 of band 12. The gasket 17 is secured to the armor strip 20 and to a major portion of the band 12 by some appropriate adhesive or by bonding, but the length of the gasket 17 between the left end of the armor strip 20 and the exterior tapered tip of the gasket is not secured to the band 12. Thus, that end of the gasket 17 may separate from the band 12. It is by this means that the band 12 and gasket 17 are opened up or expanded so that the lugs 13 and 14 and the ends of band 12 may be separated sufficiently to allow passage of a pipe between the lugs and the mounting of the clamp on the pipe. It will be appreciated that in order to allow the clamp to be expanded sufficiently to be received around a pipe, the band 12 must be bent and deformed to a significant degree. When the clamp is then mounted on the pipeline, sufficient pressure must be exerted on the band 12 by the bolts and nuts on the lugs in order to reshape the band and gasket 17 to its original circular form so that a uniform sealing pressure will be applied to the gasket 17 and the pipe 11 around their entire periphery.

Such an arrangement is satisfactory for clamps intended for use on relatively large sizes of pipes. In such clamps the length of the band and its thickness is such that it is reasonably flexible and the clamp may be expanded and reshaped to its original circular configuration with relative ease and without excessive stress being applied to the band 12. Since such clamps are particularly adapted for use on metallic pipes, the bands may be stressed or tightened to the degree necessary to return them to their original circular configuration without fear of collapsing the pipe.

In smaller size pipes however the length of the band 12 would be considerably reduced while the thickness of the band 12 would remain approximately the same. This would make the band relatively inflexible and the amount of deformation which would take place when the band and gasket were expanded sufficiently to be mounted on a pipeline would be more difficult to overcome when the clamp is mounted on the pipe and tightened down by the bolts and nuts. The result in such smaller sizes of clamps would be a deformed, non-circular shape of the band and therefore a non-uniform distribution of the radial sealing force which would be applied to the gasket 17 since it is unlikely that the band 12 could be stressed sufficiently to return it to its original circular configuration by the application of a band tightening force of any reasonable magnitude. This is particularly true when the clamp is applied to plastic pipelines which of course would collapse much more easily than metallic pipes under the stress applied to the pipe by the metallic band and gasket.

SUMMARY OF THE INVENTION

As a means of overcoming the difficulties inherent in the prior art as described above. Applicants have developed a repair clamp in which a removable sealing cartridge is enclosed within the confines of a metallic outer strip, to the ends of which, lugs have been secured. The sealing cartridge is comprised of a cylindrical axially extending gasket which has an axially extending hinge portion integral with and of the same material as the gasket and is axially split or disconnected so as to provide axially extending free end portions at a point approximately 180° displaced from the hinge portion. Two armor sleeves of substantially semi-cylindrical shape and co-extensive in axial length with the gasket are bonded to the exterior of the gasket. Each sleeve extends from the region of the hinge portion to a point just short of a respective free end of the gasket with which it is associated. With this arrangement the free ends of the cartridge, that is the free ends of the gasket and the armor sleeves, may be rotated about the hinge portion without deformation of the sleeves, to permit the cartridge to be mounted on the pipe to be repaired or the pipes to be joined together. On the pipe, the free ends of the cartridge are brought together and the exterior metallic band is mounted around the cartridge and stress applied thereto by tightening the lug bolts. By such an arrangement a full 360° a sealing effort is applied to the pipe with no deformation of the armor sleeves which support the gasket.

DESCRIPTION OF THE PREFERRED EMBODIMENT

Figure 1:
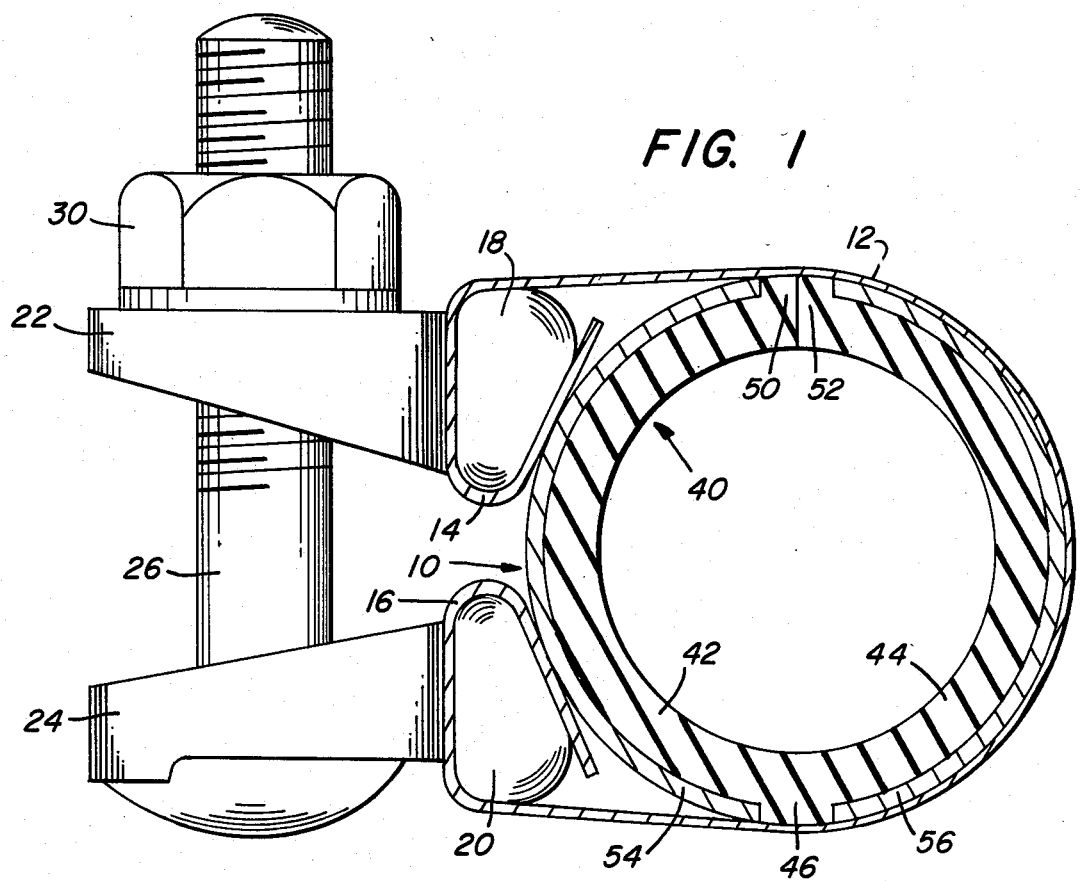
FIG. 1 is a cross section of a clamp employing the invention described herein.

Referring to FIG. 1 a clamp embodying this invention is comprised of a cylindrically shaped sealing cartridge identified generally by the numeral 10 which is received within and partially circumscribed by a strap or band 12 of some suitable metallic material such as steel. The end portions 14 and 16 of the band are bent or formed around lugs 18 and 20, the portion of the lugs contained within the end portions of the band being axially (in the direction the pipe axis) coextensive in length with the axial length of the band 12. Lug 18 has two axially spaced arms 22 (only one of which is shown) which project through a suitable opening in the end portion 14 of the band. Similarly the lug 20 has two axially spaced legs 24 (only one of which is shown) which project through an opening in the end portion 16 of the band. The head portion of a bolt 26 is received between axially spaced arms 24 and the other end of the bolt is received between axially spaced arms 22. As nut 28 is tightened down on the threaded portion of the bolt the lugs 18 and 20 are urged towards each other to cause the band 12 to apply a circumferentially extending compressive force as to the sealing cartridge 10.

Figure 2:
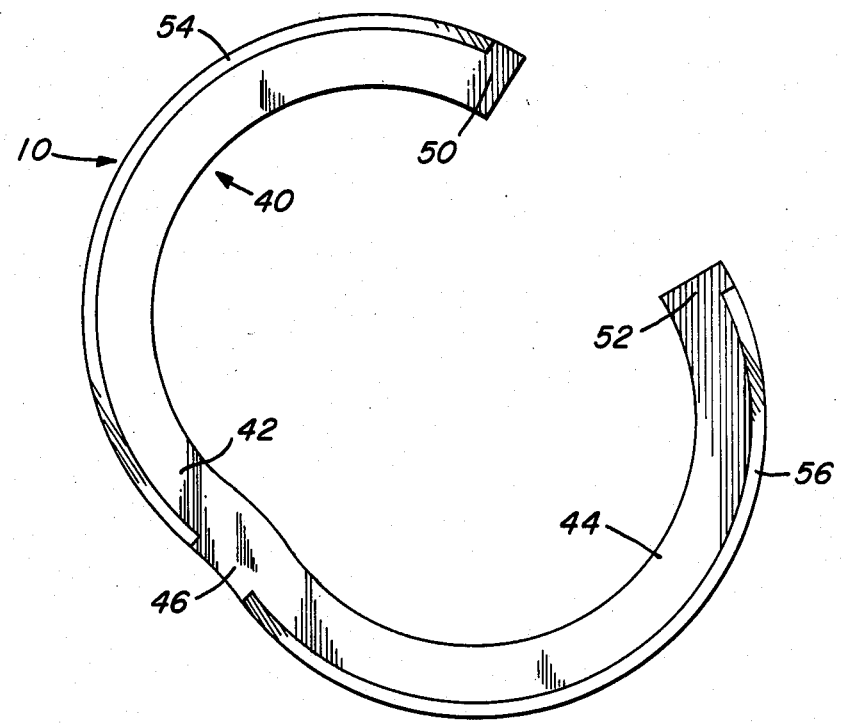
FIG. 2 is an end view of the sealing cartridge apart from the clamp assembly and expanded to permit the reception of a pipe.

The sealing cartridge 10 is comprised of a cylindrically shaped gasket 40 of a suitable elastomeric material and has segments 42 and 44 of generally semi-cylindrical configuration extending from a hinge portion 46. The hinge portion is integrally formed on, and is of the same material as, the segments 42 and 44. At a point spaced approximately 180° from the hinge 46, the gasket is axially split to provide free ends 50 and 52 as best shown on FIG. 2.

Armor sleeves 54 and 56, of generally the same configuration as the segments 42 and 44 are bonded to the exterior of segments 42 and 44. It will be noted that armor sleeve 54 extends from hinge portion 46 to the enlarged free end 50 while armor sleeve 56 extends from the hinge portion 46 to the enlarged free end 52. The hinge portion 46 and the free ends 50 and 52 are radially extended so as to form continuations of the outer surfaces of sleeves 54 and 56, so that in the clamp assembly the hinge portion 46, the ends 50 and 52 present an essentially continuous uninterrupted cylindrical surface. The armor sleeves are preferrably of steel and as shown in FIG. 1 are of greater thickness than the band 12 so as to resist deformation when the band is tightened. The relatively thin band renders it relatively flexible and insures that essentially uniform pressure is applied to the cartridge 10 throughout its circumference when the band is tightened.

When it is desired to join the end of two pipes of the same outside diameter or to repair a leak in an existing pipe, the sealing cartridge 10 is removed from the clamp assembly shown in FIG. 1 and the free ends 50 and 52 are separated by rotating the segments 42 and 46 about the hinge portion 46, which being formed of the same material as the segments has sufficient flexibility to permit the rotation of the segments 42 and 44 without deforming sleeves 54 and 56. When the segments are sufficiently rotated to permit the pipe or pipes to pass between the free ends 50 and 52, the segments 42 and 44 are manually closed so that the free ends 50 and 52 are brought into abutment with each other. The bolt 26 being removed from the arms 22 and 24, lugs 18 and 20 and the ends of the band 12 are then expanded so that the band and the lugs may be mounted in circumscribing relationship to the sealing cartridge 10. The bolt 20 is then inserted between the arms 22 and 24 and the nut 30 tightened down to apply a circumferentially extending radially compressive force to the cartridge 10 which forces the interior surface of the segments 42 and 44 into sealing relationship with the pipe and the free ends 50 and 52 into sealing engagement with each other. Since the ends of sleeves 54 and 56 do not contact each other sealing engagement of the free ends 50 and 52 is assured when the clamp is tightened down on the pipe.

The only portions of the gasket 40 which are not supported by either one of the sleeves 54 or 56 are the hinge portion 46 and the enlarged free ends 50 and 52. However, when the band 12 is mounted on the cartridge to provide the complete assembly, the hinge portion 46 and the free ends 50 and 52 are oriented so that they are both supported by the band 12 as shown in FIG. 1.

By the structure described hereinabove, applicants have provided a repair clamp which is inexpensive to manufacture, easy to apply or install and which provides a full 360° metal supported seal around the pipe. While the band 12 may become deformed during installation, the cartridge 10 retains its cylindrical configuration after installation, thus assuring a uniform sealing effort around the entire pipe circumference.

It is of course possible that the sealing cartridge 10 could be divided up into three or more segments having more than one hinge portion. In the case of three segments for example, one end of two of the segments would be hinged to opposite ends of the third segment. The free ends of the first two segments would sealingly engage each other. In all other respects the gasket and armor sleeves would be the same as described above with respect to FIGS. 1 and 2. Such an arrangement may be advantageous to accommodate large sizes of pipes but would present an unnecessary complication and expense for clamps intended for use with relatively small diameter pipes.

We claim:

1. A pipe clamp comprised of:
   a band, the ends of which are fitted with lugs;
   means extending between said lugs to urge the lugs and band ends toward each other;
   a normally cylindrically shaped gasket of elastomeric material having:
   two arcuate segments integrally joined together at one end to form a hinge portion whereby the free ends of the segments may be rotated in opposite directions about said hinge portion to permit reception of a pipe within said gasket, said free ends having sealing contact with each other;
   a separate metallic armor sleeve circumscribing the exterior of each of the segments of said gasket, said sleeves extending from respective points adjacent said hinge portion to points adjacent and spaced from respective free ends of said segments.

2. The clamp defined in claim 1 in which said free ends are spaced approximately 180° from said hinge portion.

3. The clamp defined in claim 2 in which the ends of said sleeves adjacent the hinge portion are spaced from each other and the ends of said sleeves adjacent the free ends of said segments are spaced from each other.

4. The clamp defined in claim 3 in which said hinge portion and said free ends are radially enlarged to extend respectively into the space between ends of said sleeves adjacent said hinge portion and into the space between the ends of said sleeves adjacent the free ends of said segments whereby said sleeves, said hinge portion and said enlarged free ends of said segments define a cartridge having substantially uninterrupted cylindrical exterior surface when said free ends are in contact with each other.

5. The clamp defined in claim 4 in which said cartridge is oriented within said band whereby said hinge portion and said free ends of said segments are in contact with and radially supported by said band.

6. A pipe clamp comprised of a band partially circumscribing a cylindrically shaped sealing cartridge along a major portion of its circumference, lugs secured to the opposed ends of said band, means extending between said lugs for forcing said lugs toward each other to apply a circumferentially extending radially compressive force on said cartridge, said cartridge comprising a cylindrically shaped gasket of elastomeric material having a hinge portion and axially extending mating free ends at a point circumferentially spaced from said hinge portion, separate spaced armor sleeves substantially circumscribing the exterior of said gasket and extending in opposite directions from said hinge portion to a point proximate respective free ends of said gasket, the ends of said sleeves adjacent said free ends of said gasket being spaced from each other and the ends of said sleeves adjacent said hinge portion being spaced from each other in the assembly.

7. The clamp defined in claim 6 in which said hinge portion is integral with and of the same material as said gasket.

8. The clamp defined in claim 7 in which said hinge portion and the free ends of a said gasket are radially enlarged to extend respectively into the space between the ends of said sleeves adjacent said hinge portion and into the space between the ends of said sleeves adjacent said free ends of said gasket.

9. A pipe clamp comprised of:
 a band, the ends of which are fitted with lugs;
 means extending between said lugs to urge said lugs and said band ends toward each other;
 a normally cylindrically shaped gasket of elastomeric material comprised of three arcuate segments, two hinge portions each connecting one end of two of said segments to opposite ends of the third segment, the free ends of said two segments being in engagement with each other in the assembled clamp, said hinge portions being formed integral with and of the same material as the segments adjacent to said hinge portions, respective metallic armor sleeves substantially circumscribing the exterior of each of said segments the sleeves circumscribing said two segments extending from a point adjacent the hinge portion associated with each of said segments respectively to a point adjacent the respective free ends of said segments, the sleeve circumscribing said third segment extending from a point adjacent one hinge portion to a point adjacent the other hinge portion, the adjacent ends of said sleeves being spaced from each other, said hinge portions and said free ends of said segments being radially enlarged to project into respective spaces between the ends of said sleeves associated with said hinge portions and said free ends of said segments.

* * * * *